Oct. 12, 1965 G. A. KIRK 3,211,959

MOUNTING FOR ELECTRONIC COMPONENTS

Filed July 18, 1960

INVENTOR
G. A. KIRK
BY
Forest B. Hitchcock
HIS ATTORNEY

United States Patent Office 3,211,959
Patented Oct. 12, 1965

3,211,959

MOUNTING FOR ELECTRONIC COMPONENTS

George A. Kirk, Teaneck, N.J., assignor to General Signal Corporation, a corporation of New York Filed July 18, 1960, Ser. No. 43,565
6 Claims. (Cl. 317—100)

The present invention relates to a mounting for electronic apparatus and more particularly to a structure for housing a plurality of individual electronic components; and in one specific aspect the present invention relates to an improved construction and mounting for an electron tube for dissipating the heat generated by the tube.

Heretofore, in the construction of electronic devices, where one of the components, such as an electron discharge tube, generated heat sufficiently to adversely affect other electronic components of the device, it was common practice to mount the heat generating tube on a metal chassis and provide a metallic covering or cap for the tube to conduct and dissipate the heat. The other components, such as resistors, rectifiers, condensers, or the like, were usually spaced far enough away from the metal chassis and the heat conducting cap so as not to be adversely affected by the heat. This type of construction, not infrequently, was ineffective in dissipating the heat of the tube, if the device was to be mounted in a small confined space or if the power consumed by the tube was excessive. Although various heat dissipating devices have been proposed for electron discharge tubes, they required bulky and complicated mountings, and an inefficient arrangement of parts in order to insure that the other delicate electronic components would not be adversely affected by the heat.

Moreover, in previous installations where it was necessary to protect the device from the effects of shock or vibration, the chassis was required to be provided with resilient mountings, such as springs, or a rubber like material, and/or the individual components were each provided with a resilient shock resistant mounting for damping the vibrations of the device. These known methods of protecting electronic devices from shock not only necessitated a bulky and complicated structure, which was relatively ineffective under certain circumstances, but also provided very little protection to the soldered joints that connect the wires to the various components.

Thus, previously in the construction of electronic devices where both the efficient dissipation of heat and the protection of the components against shock were of prime consideration, a small compact arrangement that could be used in a confined space was impractical. Also, where rubber like material was used for damping the vibrations accompanying shock, the heat of the device often destroyed its shock absorbing qualities. Moreover, the soldered joints would separate under conditions of extreme vibration.

The purpose of the present invention is to provide a shock absorbing heat dissipating structure in the form of a compact unit embodying a plurality of operatively connected electronic components, which can be connected to controlling and controlled apparatus by merely plugging the unit into a socket. In furtherance thereof, one of the objects of the present invention is to provide a compact mounting which effectively dissipates the heat generated by a tube without adversely affecting the other components of the device.

Another object of this invention is to provide an improved structure which encloses a heat generating electron tube that rapidly dissipates the heat generated by the tube.

Another object of this invention is to provide an improved construction for the envelope of a heat generating electron tube which aids in the conduction of heat through the envelope of the tube.

A further object of this invention is to provide an improved construction of an electronic device which protects the components against shock.

A further object of this invention is to provide an improved mounting for an electronic device which protects the wire connections from breaking and separating.

A still further object of this invention is to provide an improved mounting for electronic components wherein the material for absorbing shock also protects the components from heat.

A still further object of this invention is to provide a structure of the character described which is easy to assemble, simple in its construction, relatively inexpensive to manufacture, and can be detachably connected to other apparatus without providing external shock absorbing mountings.

Other objects of this invention will become apparent from the specification, the drawing, and the appended claims.

Figure 2:
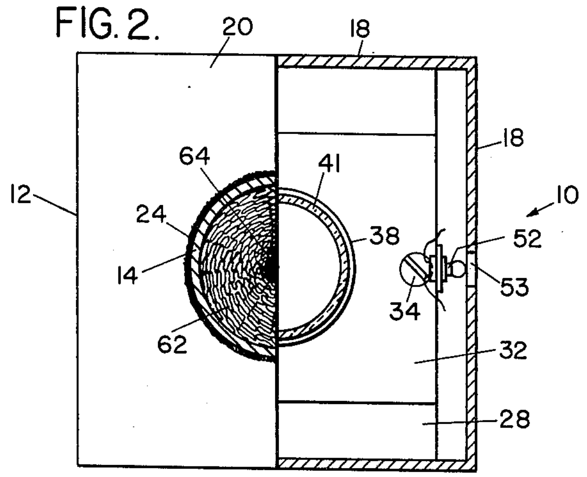
FIG. 2 is a cross sectional view taken on line 2—2 of FIG. 1 and looking in the direction of the arrows.
Figure 1:
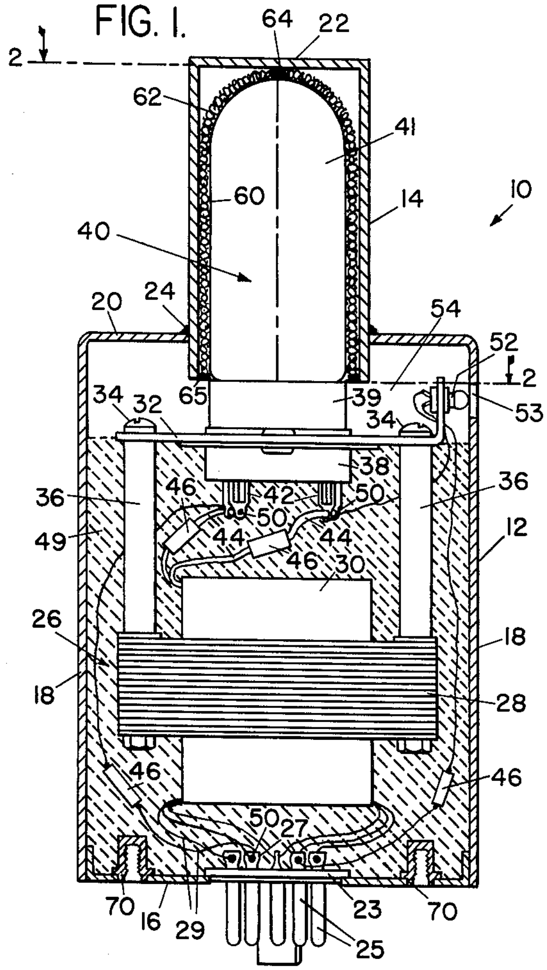
FIG. 1 is a sectional elevation of a device constructed according to one embodiment of this invention.
Figure 3:
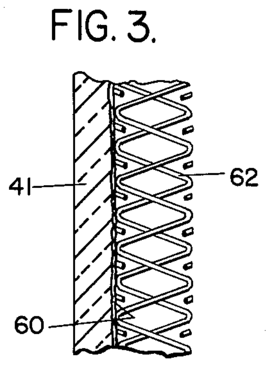
FIG. 3 is a fragmentary sectional view, only on an extremely magnified scale, showing the tube envelope and the material engaging the exterior surface of the envelope.

The present invention has been found particularly useful in the construction of a small compact amplifier for servo-systems, which permits a thyratron tube, a transformer, and a plurality of electronic components such as rectifiers, capacitors, and resistors, to be operatively connected and mounted so that the amplifier can be easily connected and disconnected, as a unit, to the servo system.

In the illustrated embodiment of the invention, an amplifier embodying a thyratron tube, a transformer, and a plurality of similar electronic components, such as resistors and capacitors, and a photocell or light sensitive tube are all mounted compactly in a metallic enclosure. In one practical application of this embodiment, the light sensitive tube is connected to provide a variable voltage input and this signal is amplified to provide a variable power output capable of directly controlling an electric motor. The entire unit in the illustrated embodiment can be merely plugged into the motor control circuit.

Referring to the drawing by numerals of reference, 10 denotes generally a sheet metal shell or housing which has an enlarged portion 12, and a smaller outwardly extending portion 14.

The enlarged portion 12 is generally cubical in configuration and has a bottom 16, side walls 18, and a top 20. The portion 14 of the housing 10 is cylindrical and has a top 22. The cylindrical portion 14 is mounted in an opening provided therefor in the top 20 of the enlarged portion 12 and secured in position by a ring of soldering or brazing material 24. The housing 10 may be made of any metal having good heat conducting and radiating properties, such as copper, polished steel, or aluminum. In one practical application the portion 14 is made of sheet copper and the enlarged portion 12 is made of steel.

In the bottom 16 of the housing is a plug connector 23 which has a plurality of spaced prongs 25 extending outwardly from the housing, so that the device can be operatively attached to an external connection, and a plurality of terminals 27 at the inner ends of the prongs so that wires such as 29 can be connected to the connector 23 inside the housing 10.

Positioned in the enlarged portion 12 of the housing and spaced from the terminals 27 is a transformer generally referred to as 26 which has a laminated core 28, and primary and secondary windings 30 which are covered with suitable insulation material. The wires 29 may be used to connect the windings of the transformer 26 to the terminals 27.

Mounted in the portion 12 of the housing is a plate 32 which is connected to the core 28 of the transformer by a plurality of elongated screws 34. This plate is held spaced from the transformer 26 by a plurality of spacer sleeves 36 which are mounted on the shanks of the screws. The plate 32 supports an electron tube connector or plug 38 which is disposed centrally of the plate for receiving the prongs of a tube 40. This plate and its connector 38 are so positioned in the portion 12 of the housing that when base 39 of the tube 40 is attached thereto its envelope 41 extends into the portion 14 of the housing. The plate 32 may be rectangular in configuration and is of such a size that it is spaced from the side walls 18 of the housing. The connector 38 has terminals 42 to which wires such as 44 may be connected such as by soldering. Those components, which may be affected by heat and shock are denoted at 46 and mounted in the housing portion 12 below the plate 32. These components 46, which may be capacitors, resistors, rectifiers or the like, are spaced from each other, and spaced from the walls 18 of the housing and the transformer 26, and may be operatively connected by the wires 29 and 44.

Surrounding the transformer 26, the components 46, terminals 27, wires 29, terminals 42, and filling the portion 12 of the housing 10 up to the level of the plate 32 is a mass of heat insulating, shock absorbing plastic material. This material may be of any composition which has the characteristics of insulating articles that are embedded therein from heat and simultaneously absorbs shock. In practice, polyurethane foam has been found to have these characteristics, including deadening the force of any shock. This characteristic not only protects the components themselves that are suspended in this material, but also because it does not have the resiliency and vibrate such as a rubber like material, the soldered joints which are suspended therein and are denoted at 50 do not separate or break. The tube 40 which is spaced from the housing 10 is supported by its connector 38 and thus also is protected against shock by the characteristics of the polyurethane foam. A photocell 52 which is shown aligned with an opening 53 in a sidewall 18 of the housing is also attached to the plate 32 and positioned in an airspace 54 of the housing 10.

The effectiveness of this type of mounting was proved in shock tests which subjected the device to vibrations from 50 to 500 cycles at a displacement of .040 of an inch without adverse affect. This test was conducted with the device in every different position of orientation. The device also was subjected to repeated blows at a force of 750 times gravity without adversely affecting the components or their connections.

The glass envelope 41 of the tube has a roughened exterior surface 60, which is accomplished by sandblasting, and a coating of graphite particles over the roughened surface. The graphite is applied in the form of a solution of alcohol and graphite known as "aquadag." The roughening of the exterior surface of the envelope 41 increases the surface area of the glass and also serves to anchor the graphite particles to the glass surface 60. This roughened surface aids in the conduction of heat through the glass envelope 41 and this conduction is further aided by the graphite coating.

Interposed between and in intimate contact with the inner surface of the housing 14 and the coated exterior of the envelope 41 is a sleeve 62 which is made of woven strands of metallic material. This material is preferably copper, but may be made of any good heat conducting metal, such as steel, or aluminum. This material is resilient and is of such a thickness that it fits between tube envelope 41 and the portion 14 of the housing 10 with a slight compression fit to insure that a good contact area between the metal strands or fibers of the sleeve 62 and the tube amplifier 41 and housing portion 14 is obtained. The metallic material which may be referred to as a metallic wool may be supplied in tubular form which is gathered at one end and soldered such as at 64 so that the entire envelope 41 is covered. A ring of solder 65 around the other end of the sleeve 62 prevents fraying of the woven material.

The heat generated by the tube 40 is efficiently conducted through the glass envelope because of its roughened exterior surface and graphite coating, and is then conducted to the metallic housing portion 14 by the metallic wool material 62. This heat is further conducted and dissipated throughout the portion 12 of the housing. The plastic material 49 which surrounds the components in the housing prevents the heat from radiating inwardly in the housing and also protects the components embedded in the material 49 by acting as an insulation heat barrier. The polyurethane foam material is effective to protect the components from heat in excess of 100° C. and in one practical application an amplifier having a thyratron tube, such as 40, dissipated 30 watts of power under full load, and the heat accompanying this power was effectively radiated.

In assembling this structure first, the components which include the transformer 26, components 46, and the tube mounting 38 are all operatively connected together and fastened to the connector 23 which is mounted in the bottom 16 of the housing 10. The connected and mounted components are then inserted in the housing portion 12 and the bottom 16 is soldered or otherwise attached in position. The polyurethane foam 49 is then poured into the housing portion 12 until it reaches the level of the plate 32 in the housing. This foam material 49 requires about two minutes to set and completely hardens in twenty-four hours. The tube 40 which has been sandblasted and painted with the alcohol and graphite solution, is then attached to its mounting 38, and the sleeve 62 is fitted over the envelope 41. The cylindrical housing portion 14 is then slipped over the tube envelope 41 which slightly compresses the sleeve 62, and the cylindrical housing is then soldered or brazed around its perimeter such as denoted at 24.

In use this device may be conveniently attached operatively to an external device by its plug 23, and if desired the housing 10 can be rigidly mounted to an external device by threading screws into sockets 70 provided in the bottom 16.

In the preferred form of the invention, the electron tube is surrounded by the cylindrical metal housing with the metallic wool material interposed between and in contact with the tube envelope and the metallic housing and the metallic housing is fastened to the casing containing the other components as by welding or brazing. However, it is contemplated that the electron tube having the roughened envelope that is coated with graphite may be used advantageously by merely plugging it into a conventional mounting chassis. It is also contemplated that the tube may be enclosed by a metallic housing that is fastened to a conventional mounting chassis with or without the metallic wool material covering the roughened and coated tube envelope.

It is understood, that the tube connector 38 may be attached to another component if a transformer is not to be used or otherwise supported in the plastic material, and that more or less components may be embedded in the plastic material according to the needs of practice.

Having described one embodiment of a mounting for electronic components provided according to the present invention, it is to be understood that various adaptations, alterations and modifications may be applied to the specific form shown in accordance with the requirements of practice within the spirit or scope of the present invention, except as limited by the appending claims.

What I claim is:

1. An electronic plug type assembly, comprising a hollow sheet metal housing, means attached to one wall of said housing for removably connecting electrically said assembly to control and controlled apparatus, another wall of said housing having a central opening therein, a plurality of interconnected electrical devices positioned in said housing and spaced from the walls thereof, a shock absorbing heat resistant plastic material filling said housing around said electrical devices to support said devices spaced from each other and from the walls of the housing, a female plug type connector for receiving the male base connectors of an electron tube positioned in said housing and embedded in the heat resistance plastic material to have its receiving portion exteriorly of said plastic material and in registry with said opening, an electron discharge tube having a base and an elongated glass envelope, said tube being insertably fastened by its base connectors to said plug-type connector and said connector being so positioned that substantially the major portion of the glass envelope of the tube extends exteriorly of the upper wall of said housing through said opening, an elongated cylindrical sheetmetal cap enclosing completely the glass envelope of the tube and sealingly attached to said upper wall adjacent the peripheral edge of the opening, said metallic cap being so positioned and dimensioned that its inner surface is in close spaced relation to the exterior surface of the glass envelope, fibrous metallic heat conducting material interposed and in intimate contact with the glass envelope and the metallic cap, whereby the tube mounted in the assembly is protected against shock while the heat from the tube is effectively dissipated exteriorly of the housing by the fibrous material and the metallic cap, and the electrical devices are further protected from the heat of the tube and shock by the plastic mass in the housing.

2. An assembly according to claim 1 wherein the fibrous metallic material is in the form of a sleeve that is closed at one end to engage the entire exterior surface of said glass envelope.

3. An assembly according to claim 1 wherein the exterior surface of the glass envelope is roughened to increase the surface area thereof and said roughened surface is coated with a heat absorbing material comprising carbon particles.

4. An assembly according to claim 1 wherein said plastic material is polyurethane foam.

5. A unitary structure for supporting a plurality of interconnected electrical devices and an electron discharge tube having a glass envelope, comprising a metallic base portion for supporting said plurality of electrical devices, a metallic cap that is closed at one end and is rigidly attached at its other end to said metallic base for receiving therein the glass envelope of the electron tube, said electron tube being mounted so that its glass envelope extends into said cap and said cap being of such dimension that the glass envelope and the walls of the cap are in close spaced relation, said tube envelope having a coating of graphite particles covering the exterior surface thereof, a mass of fibrous metallic wool interposed and in intimate contact with the exterior surface of the tube and the inner surface of the metallic cap, whereby said tube is protected against shock and yet the heat generated by the tube is effectively dissipated through the tube envelope and the graphite coating to the metallic wool and the cap.

6. A structure according to claim 5 wherein the exterior surface of the glass envelope of said tube is roughened to increase the surface area thereof.

References Cited by the Examiner

UNITED STATES PATENTS

| | | | |
|---|---|---|---|
| 1,774,421 | 8/30 | Carpenter | 317—101 |
| 1,958,953 | 5/34 | Parker | 174—35 |
| 2,314,060 | 3/43 | Victoreen | 174—35 |
| 2,714,518 | 8/55 | Bickler | 174—35 |
| 2,737,579 | 3/56 | Wehrlin | 317—101 |
| 2,845,474 | 7/58 | Langworthy et al. | 174—35 |
| 2,913,633 | 11/59 | Iannelli | 317—101 |
| 2,960,633 | 11/60 | Hall | 317—100 |

LARAMIE E. ASKIN, *Primary Examiner.*

SAMUEL S. BERNSTEIN, JOHN F. BURNS, *Examiners.*